Jan. 26, 1965   H. G. STENGER ETAL   3,167,293
ATTACHMENT FOR USE WITH A RECIPROCATING COMPRESSOR
Filed June 26, 1962   2 Sheets-Sheet 1
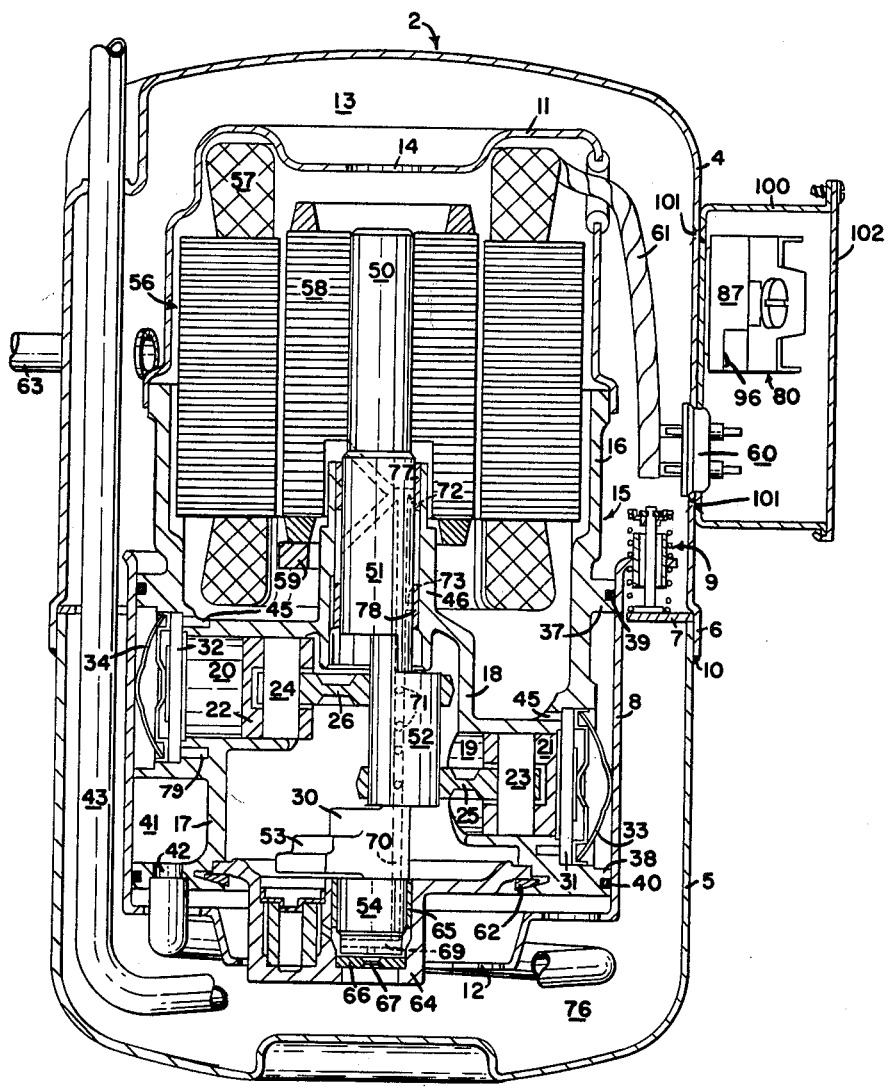
FIG. I
INVENTORS.
HARVEY G. STENGER.
TADEK M. KROPIWNICKI.
BY
ATTORNEY.

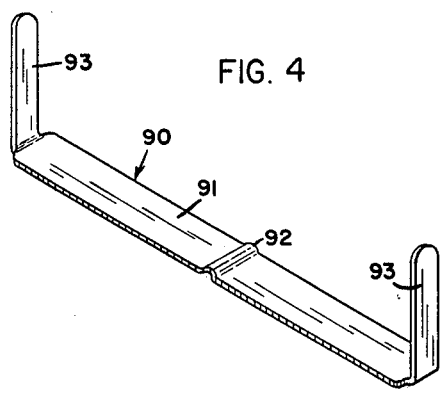
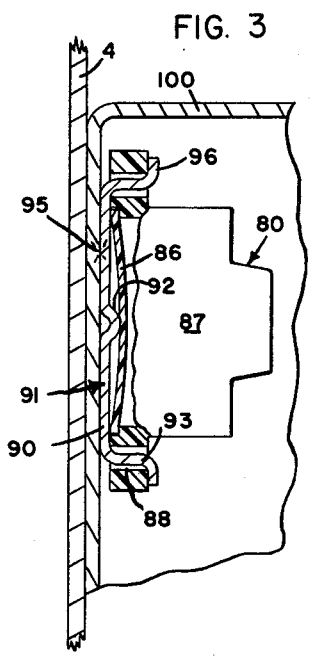
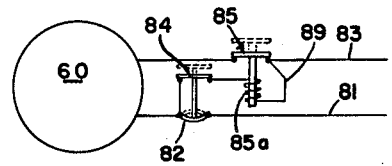

United States Patent Office 3,167,293
Patented Jan. 26, 1965

3,167,293
ATTACHMENT FOR USE WITH A RECIPRO-
CATING COMPRESSOR
Harvey G. Stenger, Skaneateles, and Tadek M. Kropiw-
nicki, Syracuse, N.Y., assignors to Carrier Corpora-
tion, Syracuse, N.Y., a corporation of Delaware
Filed June 26, 1962, Ser. No. 205,342
5 Claims. (Cl. 248—309)

The present invention relates to a reciprocating compressor and, more particularly, to a reciprocating compressor having an apparatus for attaching a structure thereto and to a method of attaching the structure thereto.

The attaching of a structure, for example, a motor overload control, directly to the housing of machinery often presents a difficult and perplexing problem. The machinery itself, for example, a reciprocating compressor, may be a source of vibration. Physical movement of the machinery, such as occurs during loading and unloading thereof, may present sudden shocks to any structure attached thereto. Thus, the manner in which the structure is attached, as well as the attachment per se, should ideally not only serve to effectively secure the particular structure to the machinery but should offer a measure of protection to the attached structure against vibration, shock, etc., emanating from the machinery itself and resulting from physical movement of the machinery.

Attachments may be generally classified as either permanent or semi-permanent. In mounting a structure, such as a motor overload control on the housing of a reciprocating compressor, a permanent attachment such as welding is usually avoided due to the service and replacement problem inherent in that type of attachment. Semi-permanent attachments, for example, screws, rivets, etc., permit removal and replacement of the structure attached, but are, however, subject to loosening and failure due to vibration, sudden shock, etc.

Further, since many structures, such as motor overload controls may be adversely affected by vibration and shock, it is often desirable to insulate the structure from the machinery to damp out vibrations emanating from the machinery and to cushion the object against exterior shocks. Such insulation may be in the form of rubber blocks, springs, etc., inserted between the structure and the machinery.

The primary object of this invention is to provide a reciprocating compressor with an improved means and method for attaching a structure thereto.

A further object of this invention is to provide a novel mounting bracket for effectively attaching a structure to the exterior of a housing.

Another object of this invention is to provide a novel attachment which, in cooperation with the attached structure, results in a vibration and shock absorbing mounting, thereby avoiding the use of separate insulation means.

A further object of the present invention is to provide a hermetic compressor having a motor overload control attached to the compressor casing in a novel manner wherein the overload control casing is made to function as a vibration damper.

An additional object is to provide a novel method for effectively attaching a structure to reciprocating and rotating machinery wherein the casing of the structure attached is made to serve as a vibration dampener. Other objects will be readily perceived from the following description.

The invention relates to a reciprocating compressor having a housing, a crankshaft journalled therein, a compression mechanism operatively connected to said crankshaft, a driving motor operatively connected to said crankshaft, a conductor including a motor control operatively connecting the driving motor to a source of electric power, the motor control including a casing having openings therein and a flexible base, an attachment therefor fixedly attached to the outside of the compressor casing and having an outward deformation intermediate the ends thereof with opposite ends extending outwardly for insertion through the casing openings so that bending of the bracket ends causes inward movement of the casing to arc said flexible base outwardly to resiliently attach said motor control to said compressor housing.

The invention further relates to a method of attaching an encased structure to a reciprocating compressor housing including the steps of attaching a U-shaped bracket having a slight outward deformation substantially at the mid-point of the base thereof to the reciprocating compressor housing, placing the structure over the bracket with the bracket legs extending through opposite holes in the structure casing, bending the bracket legs into contact with the casing to force the structure casing into engagement with the bracket deformation, the bracket deformation causing inward arcing of the structure casing base to thereby resiliently attach the structure to the compressor housing.

The attached drawing illustrates a preferred embodiment of the invention in which:

FIGURE 1 is a sectional view of a hermetic compressor unit employing the present invention;

FIGURE 2 is a schematic wiring diagram of the compressor motor including a motor overload protector;

FIGURE 3 is an enlarged sectional view of the overload control and novel attaching bracket; and FIGURE 4 is a plan view of the attaching bracket of the present invention.

Referring to FIGURE 1, there is shown the compressor 2 embodying the present invention. The compressor 2 comprises an upper shell 4 and a lower shell 5. A mounting ring 7 is attached to the upper portion of shell 5. Shell 4 is provided with a flanged section 6 which overlaps the lower shell 5. Annular weld 10 secures shells 4 and 5 together to form a hermetic housing. Also included in the compressor is a third shell 8 which is joined to the mounting ring 7 through a resilient mounting 9. The upper and lower sections of the shell are in communication. The shell 8 also has a lower opening 12. Mounted within the inner shell 8 is a compressor block 15 which consists of a motor flange portion 16 and a crankcase flange portion 17 divided by a suitable partition 18. A motor cover 11 is attached to the motor flange portion 16. Also located in the compressor block are suitable cylinders 19 and 20. It is appreciated that any desired number of cylinders may be employed. Suitable pistons 21 and 22 are reciprocatingly mounted within the cylinders 19 and 20 and these pistons have mounted therein suitable wrist-pins 23 and 24 which are in turn rotatably connected to the connecting rods 25 and 26. These connecting rods 25 and 26 are rotatably connected to the eccentric portion of the crankshaft 30.

At the extremities of the cylinders 19 and 20 are located suitable valve assemblies 31 and 32 which may be similar to those shown in Patent No. 2,935,248, granted May 3, 1960, to Karl M. Gerteis.

These valve assemblies are retained within their respective positions by suitable spring retainers 33 and 34. These spring retainers 33 and 34 are biased between the valve assemblies 31 and 32 and the shell 8 thereby retaining the valve assemblies in position.

Two circular sealing flanges 37 and 38 are provided on the compressor block in concentric spaced relationship. These particular flanges are provided with suitable O rings 39 and 40 which seal the space between the block and shell 8 thereby defining an annular space 41 into which gas compressed within the cylinders 19 and 20 is discharged. The discharge gases are passed from the compressor through the discharge passage 42 into discharge tube 43 extending through the shell 8, the mounting ring 7, and the shell 5. If it is desired, suitable cavities may be incorporated in the annular space 41 to impart a muffling effect to the discharge gases which are passed from the various cylinders of the compressor. Suction gas is introduced through the opening 63 in the shell 4. This opening 63 permits suction gas to pass into the motor compartment 13 into opening 14 in motor cover 11 and through the various suction ports 45. The suction ports 45 are connected to annular spaces 79 located beneath the valve assemblies 31 and 32. A more detailed description of the compression side of the compressor is disclosed in Patent No. 3,008,629, granted November 14, 1961, to Karl M. Gerteis.

It will be noted at this point that the various suction openings 45 are the only openings located in the area of partition 18 with the exception of the bearing housing 46 through which the crankshaft 30 is journalled. This crankshaft 30 comprises a straight portion 50 which is adapted to be connected to the motor 56, a bearing portion 51 which is adapted to be journalled within the bearing housing 46, an eccentric portion 52 adapted to be connected to the various connecting rods which are operatively associated with the pistons, a counterweight section 53 which is adapted to aid in counteracting the unbalance of the eccentric portion 52, pistons 21, 22 and connecting rods 25, 26 and a lower bearing portion 54.

The motor 56 comprises a stator 57 which is mounted within the motor flange portion 16 of the compressor block. The stator is inductively connected to the rotor 58 which is force-fitted onto the crankshaft section 50. Located and attached to the rotor 58 is a suitable counterweight 59 which is also adapted to aid in counteracting the running gear unbalance.

In order to direct electric current from a suitable source to the stator 57, a suitable plug 60 is provided in the shell of the compressor in such a manner as to preserve the hermetic nature of the compressor. This plug 60 is connected by suitable conductors 61 to the stator 57.

The crankshaft lower bearing portion 54 is journalled within a lower bearing 65 which is mounted in the lower bearing head 64. This lower bearing head 64 is maintained in position by a suitable snap ring 62 which seats within an annular groove in the compressor block. The bearing head also includes a thrust bearing 66 which has a central opening 67 communicating with the lower portion of the crankshaft adjacent the bearing portion 54 and a radial hole 69. Hole 69 serves as a lubricant pump. A vertical oil distribution passage 70 communicates with the hole 69. Passage 70 directs oil to discharge openings 71 to lubricate the connecting rods and to openings 72 and 73 to lubricate the upper bearings 77 and 78 respectively. Oil is stored in sump 76 of the compressor. The lubrication system is more fully described in Patent No. 3,008,628, granted November 14, 1961, to Karl M. Gerteis et al.

The operation of the compressor is as follows: Suction gas is introduced through the openings 63 into the motor compartment 13. The gas passes through the opening 14 over the motor 56 suitably cooling the motor and then passes through the suction inlets 45 through the valve plates 31 and 32 into the cylinders 19 and 20 wherein the gas is compressed. The gas is then, on the discharge stroke, passed into the annular manifold 41 wherein, if desired, a suitable muffler construction may be employed and then passed through the discharge passage 42 and discharge tube 43 out of the compressor.

Referring more particularly to FIGURE 2 of the drawings, plug 60 is shown connected to a source of power by means of lines 81 and 83. Overload control 80 includes a temperature responsive thermal disc 82 in power line 81 and a normally open controller switch 85 in power line 83. A pilot circuit 89 is provided between the power lines 81 and 83. Pilot circuit 89 is provided with a normally closed switch 84 adapted to be opened by thermal disc 82 in a manner to be more fully explained and a coil 85a adapted, when energized, to close normally open switch 85.

It is understood that the temperature of thermal disc 82 changes in response to changes in the amount of current drawn by motor 56. Therefore, thermal disc 82 is responsive to changes in load on the motor 56. At a predetermined disc temperature change representing a predetermining overload, overload disc 82 snaps so as to bow in an opposite direction. Switch 84, which is responsive to movement of the disc 82, is accordingly actuated.

At start up coil 85a of pilot circuit 89 is energized to close controller switch 85 to start motor 56. During periods of normal load, motor 56 operates uninterrupted by controller 80. Upon a predetermined overload on motor 56 thermal disc 82 snaps so as to bow outwardly, the movement thereof opening switch 84. Coil 85a is de-energized and control switch 85 accordingly opens breaking the power line 83 to stop the motor 56 and the compressor.

Referring particularly to FIGURE 3 of the drawings, the overload control 80 includes a casing comprising an outer cover 87 and a flexible base 86. It is understood that base 86 may be of any suitable flexible material such as rubber, plastic, metal, etc. Mounting holes 88 are provided in outer cover 87.

The overload control 80 is mounted on the exterior of compressor shell 4 within the box 100. Box 100 is rigidly attached to the exterior of the compressor shell 4 by suitable means, for example, welds 101, and is provided with a removable access cover 102.

Referring particularly to FIGURES 3 and 4 of the drawing, a mounting bracket 90 for attaching overload control 80 within the box 100 includes a base 91 of flat material. A deformation or round 92 is provided at the mid-point of the bracket base 91. The bracket ends 93 extend at right angles to the plane of the bracket base 91.

In use, bracket 90 is secured within the box 100 by suitable means such as by welds 95. The overload control 80 is positioned on bracket 90 with bracket ends 93 entering holes 88. The bracket ends 93 are bent into engagement with the outside of overload case 87 at 96 forcing the control inwardly toward shell 4. Inward movement of the control causes base 86 to contact deformation or round 92 of bracket 90, the base 86 arcing inwardly. Inwardly arced base 86 serves as a spring to absorb and dampen vibrations emanating from the machinery.

It is understood that the mounting bracket 90 may be used to attach any structure having a flexible base to another. The disclosure is therefore not to be construed as limiting the use of the bracket 90 to attachment of a motor overload control to the exterior of a reciprocating compressor housing.

The present invention offers an extremely simple and economical apparatus and method for effectively attaching one structure to another machinery casing, the attaching bracket and method causing the structure casing itself to act as a vibration dampener.

While applicants have described a preferred embodiment of the invention, it will be understood that the invention is not limited thereto since it may be otherwise embodied within the scope of the following claims.

We claim:
1. In the method of attaching a structure having a casing with a flexible base and oppositely disposed mounting holes therein on a housing, the steps which consist in rigidly attaching the base of a U-shaped bracket to the housing, placing the structure on the bracket whereby the bracket ends extend through the casing holes, bending the bracket ends into contact with the structure casing to force the casing inwardly to lock the casing to the bracket, and simultaneously arcing the flexible base of the casing whereby the structure is resiliently attached to the housing.

2. In a reciprocating compressor having a housing with compression means including a drive motor therein, and switch means for connecting the drive motor to a source of electric power, the combination of a member adapted to be fixedly attached to said housing having spaced mounting elements extending in an outward direction, a portion of said member between said elements being formed to extend in an outward direction, and an enclosure for said switch means having a resilient wall adapted to abut said member outwardly formed portion, said enclosure having mounting openings therein for receiving said member mounting elements so that bending of said member mounting elements into contact with said enclosure forces said enclosure in an inward direction to attach said enclosure to the compressor housing, engagement of said enclosure resilient wall with said member outwardly formed portion causing said resilient wall to arc.

3. Apparatus as recited in claim 2 in which said member includes a pair of mounting elements, said member outwardly formed portion being positioned intermediate said paired mounting elements.

4. In combination, a member adapted to be fixedly attached to a structure, said member having a slightly outwardly deformed portion and spaced outwardly extending fastening elements, and an enclosure having spaced mounting openings therein through which the terminal ends of said mounting elements are adapted to pass so that bending of said elements into contact with said enclosure forces said enclosure inwardly to connect said enclosure with said structure, said enclosure having a resilient wall portion between said mounting openings adapted to abut said member deformed portion, said member deformed portion causing said resilient wall portion to arc outwardly to establish a resilient connection between said structure and said enclosure.

5. In combination, an enclosure having a resilient base and a pair of spaced mounting openings therein, and means for connecting said enclosure to a structure comprising a member having a base portion adapted to be fixedly attached to the structure and outwardly extending bendable arms adapted to pass through said enclosure mounting openings, said member base portion having a slight outward deformation so that movement of said enclosure toward the structure upon bending of said member arms brings said enclosure resilient base into abutting relationship with said member deformation to arc said resilient base whereby said enclosure is resiliently connected to said structure.

References Cited in the file of this patent
UNITED STATES PATENTS

| | | |
|---|---|---|
| 1,416,969 | O'Connor | May 23, 1922 |
| 1,609,915 | Bangs | Dec. 7, 1926 |
| 1,645,680 | Parker | Oct. 18, 1927 |
| 1,813,914 | Corcoran | July 14, 1931 |
| 1,915,230 | Hooper | June 20, 1933 |
| 2,225,592 | MacFadden | Dec. 17, 1940 |
| 2,687,693 | Hudson | Aug. 31, 1954 |
| 2,811,019 | Courtney | Oct. 29, 1957 |